US012658600B2

(12) United States Patent
Odes et al.

(10) Patent No.: US 12,658,600 B2
(45) Date of Patent: Jun. 16, 2026

(54) VERTICALLY POLARIZED LOW PROFILE SLOT ANTENNA ON GLASS BESIDE A CONDUCTOR

(71) Applicant: GM Global Technology Operations LLC, Detroit, MI (US)

(72) Inventors: Uriel Zvi Odes, Givaat Shmuel (IL); Nahel Eshaq, Rochester, MI (US); Duane S. Carper, Davison, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/675,844

(22) Filed: May 28, 2024

(65) Prior Publication Data

US 2025/0372887 A1 Dec. 4, 2025

(51) Int. Cl.
*H01Q 21/06* (2006.01)
*H01Q 1/12* (2006.01)
*H01Q 13/10* (2006.01)

(52) U.S. Cl.
CPC ......... *H01Q 21/064* (2013.01); *H01Q 1/1278* (2013.01); *H01Q 13/10* (2013.01)

(58) Field of Classification Search
CPC .... H01Q 21/06; H01Q 21/064; H01Q 1/1271; H01Q 1/1278; H01Q 1/1285; H01Q 1/27; H01Q 1/32; H01Q 1/325; H01Q 1/3275; H01Q 13/10
See application file for complete search history.

(56) References Cited

U.S. PATENT DOCUMENTS 5,012,255 A * 4/1991 Becker .................... H05B 3/84 343/704
5,355,144 A * 10/1994 Walton .................. H01Q 13/16 343/769
5,589,839 A 12/1996 Lindenmeier et al.
(Continued)

FOREIGN PATENT DOCUMENTS

JP S6352305 U 4/1988
JP 2011193381 A 9/2011
(Continued)

OTHER PUBLICATIONS

German Office Action for German Application No. 102024120184.3; dated Apr. 1, 2025; 4 pages.
(Continued)

*Primary Examiner* — Jason M Crawford
(74) *Attorney, Agent, or Firm* — CANTOR COLBURN LLP

(57) ABSTRACT

A vehicle includes a window with an antenna assembly. The window includes a glass surface, a metal frame, and a set of defroster wires. A top defroster wire and a top edge of the metal frame define an antenna region. The antenna assembly includes a slot antenna disposed within the antenna region. The slot antenna is disposed on a glass surface of the window in a visible region of the window with a top side located proximate a horizontal cover line of the metal frame. A feed point is located in a central area of the slot antenna, and a first slot and a second slot of the slot antenna intersect at the feed point. A feed line extends from the feed point through a separation gap between the metal frame and the glass surface to connect the slot antenna to a communication device.

20 Claims, 9 Drawing Sheets

(56) References Cited

U.S. PATENT DOCUMENTS

| | | | | |
|---|---|---|---|---|
| 5,898,407 | A | 4/1999 | Paulus et al. | |
| 6,097,345 | A * | 8/2000 | Walton | H01Q 5/371 343/769 |
| 6,111,552 | A | 8/2000 | Gasser | |
| 9,337,525 | B2 * | 5/2016 | Dai | H01Q 1/1271 |
| 2006/0152421 | A1 * | 7/2006 | Baranski | H01Q 13/10 343/704 |
| 2008/0169989 | A1 | 7/2008 | Li et al. | |
| 2012/0098716 | A1 * | 4/2012 | Dai | H01Q 1/1271 343/713 |
| 2012/0154229 | A1 * | 6/2012 | Kagaya | H01Q 13/10 343/713 |
| 2012/0256798 | A1 * | 10/2012 | Paulus | H01Q 13/10 343/713 |
| 2014/0060921 | A1 | 3/2014 | Reul et al. | |
| 2015/0207203 | A1 * | 7/2015 | Lee | H01Q 1/1271 343/713 |
| 2015/0357700 | A1 * | 12/2015 | Kagaya | H01Q 1/27 343/770 |
| 2017/0033433 | A1 | 2/2017 | Winkelmann et al. | |
| 2017/0040662 | A1 | 2/2017 | Dai | |
| 2017/0324141 | A1 | 11/2017 | Talty et al. | |
| 2017/0346154 | A1 * | 11/2017 | Kagaya | H01Q 13/106 |
| 2018/0138586 | A1 * | 5/2018 | Takeuchi | H01Q 5/371 |
| 2018/0151939 | A1 * | 5/2018 | Hashimoto | H01Q 1/1271 |
| 2019/0165447 | A1 * | 5/2019 | Furlan | H01Q 1/48 |
| 2019/0273302 | A1 * | 9/2019 | Dai | H01Q 5/30 |
| 2020/0251804 | A1 * | 8/2020 | Takeuchi | H01Q 13/16 |
| 2021/0234254 | A1 * | 7/2021 | Dai | H01Q 13/10 |
| 2022/0311123 | A1 | 9/2022 | Mamuro et al. | |
| 2023/0045425 | A1 | 2/2023 | Yamamoto et al. | |
| 2024/0275020 | A1 * | 8/2024 | Takeuchi | H01Q 1/1271 |
| 2025/0167423 | A1 | 5/2025 | Kim et al. | |
| 2025/0372860 | A1 | 12/2025 | Odes et al. | |
| 2025/0372877 | A1 * | 12/2025 | Odes | H01Q 9/30 |
| 2025/0372887 | A1 * | 12/2025 | Odes | H01Q 21/064 |

FOREIGN PATENT DOCUMENTS

| | | | |
|---|---|---|---|
| JP | 2013026800 | A | 2/2013 |
| WO | 2024117114 | A1 | 6/2024 |

OTHER PUBLICATIONS

German Office Action for German Application No. 102024121301.9; dated May 5, 2025; 11 pages.

* cited by examiner

VERTICALLY POLARIZED LOW PROFILE SLOT ANTENNA ON GLASS BESIDE A CONDUCTOR

INTRODUCTION

The subject disclosure relates to antennas used in vehicles, and in particular to an antenna assembly that can be implemented in a window that includes defrosting wires.

Vehicles include antennas for communication of various signals, such as radio signals, satellite signals, etc. As antenna size has decreased, the options for antenna placement have increased. Placing an antenna on a back window of a vehicle is however hindered by the presence of defroster wires, which take up a majority of the area of the back window. Accordingly, it is desirable to provide an antenna assembly that can be arranged to fit in, and operate within, a region of the back window not used by the defroster wires.

SUMMARY

In one exemplary embodiment, an antenna assembly suitable for use in a window of a vehicle is disclosed. The antenna assembly includes a slot antenna, a feed point and feed line. The slot antenna has a top side and a bottom side opposite the top side, wherein the slot antenna is disposed on a glass surface of the window in a visible region of the window with the top side located proximate a horizontal cover line of a metal frame of the window. The feed point is located in a central area of the slot antenna, wherein the slot antenna includes a first slot and a second slot which intersect at the feed point. The feed line extends from the feed point through a separation gap between the metal frame and the glass surface, wherein the feed line connects the slot antenna to a communication device.

In addition to one or more of the features described herein, the metal frame is on top of over a part of the glass surface and is separated from the glass surface by a separation gap and a portion of the slot antenna resides in the separation gap and conductive adhesive layer in the separation gap that electrically couples the portion of the slot antenna to the metal frame.

In addition to one or more of the features described herein, the conductive adhesive layer includes a urethane adhesive.

In addition to one or more of the features described herein, the first slot and the second slot are one of symmetrical about a feed line axis and asymmetrical about the feed line axis.

In addition to one or more of the features described herein, the slot antenna includes a mesh of electrical wires.

In addition to one or more of the features described herein, the top side of the slot antenna is one of aligned with the horizontal cover line of the metal frame and separated from the horizontal cover line by a preselected gap.

In addition to one or more of the features described herein, the window is a back window including a set of defroster wires and the slot antenna is disposed within an antenna region between the set of defroster wires and a top edge of the metal frame.

In another exemplary embodiment, a window of a vehicle is disclosed. The window includes a glass surface, a metal frame around the glass surface, a set of defroster wires in the glass surface, wherein a top wire of the set of defroster wires is separated from a top edge of the metal frame by an antenna region, and a slot antenna disposed in the antenna region. The slot antenna has a top side and a bottom side opposite the top side, wherein the top side is located proximate a horizontal cover line of the metal frame, a feed point located in a central area of the slot antenna, wherein the slot antenna includes a first slot and a second slot which intersect at the feed point, and a feed line that extends from the feed point through a separation gap between the metal frame and the glass surface, wherein the feed line connects the slot antenna to a communication device.

In addition to one or more of the features described herein, the metal frame is on top of over a part of the glass surface and is separated from the glass surface by a separation gap and a portion of the slot antenna resides in the separation gap, further comprising a conductive adhesive layer in the separation gap that electrically couples the portion of the slot antenna to the metal frame.

In addition to one or more of the features described herein, the conductive adhesive layer includes a urethane adhesive.

In addition to one or more of the features described herein, the first slot and the second slot are one of symmetrical about a feed line axis and asymmetrical about the feed line axis.

In addition to one or more of the features described herein, the slot antenna includes a mesh of electrical wires.

In addition to one or more of the features described herein, the top side of the slot antenna is one of aligned with the horizontal cover line of the metal frame and separated from the horizontal cover line by a preselected gap.

In addition to one or more of the features described herein, the window is a back window of the vehicle.

In yet another exemplary embodiment, a vehicle is disclosed. The vehicle includes a window having a glass surface, a metal frame around a perimeter of the window, the metal frame defining at least a horizontal cover line and a vertical cover line, wherein the metal frame is separated from the glass surface by a separation gap, a set of defroster wires in the glass surface, wherein a top wire of the set of defroster wires is separated from a top edge of the metal frame by an antenna region, and a slot antenna disposed in the antenna region. The slot antenna has a top side and a bottom side opposite the top side, wherein the top side is located proximate a horizontal cover line of the metal frame, a feed point located in a central area of the slot antenna, wherein the slot antenna includes a first slot and a second slot which intersect at the feed point, and a feed line that extends from the feed point through a separation gap between the metal frame and the glass surface, wherein the feed line connects the slot antenna to a communication device.

In addition to one or more of the features described herein, the metal frame is on top of over a part of the glass surface and is separated from the glass surface by a separation gap and a portion of the slot antenna resides in the separation gap, further comprising a conductive adhesive layer in the separation gap that electrically couples the portion of the slot antenna to the metal frame.

In addition to one or more of the features described herein, the conductive adhesive layer includes a urethane adhesive.

In addition to one or more of the features described herein, the first slot and the second slot are one of symmetrical about a feed line axis and asymmetrical about the feed line axis.

In addition to one or more of the features described herein, the slot antenna includes a mesh of electrical wires.

In addition to one or more of the features described herein, the top side of the slot antenna is one of aligned with the horizontal cover line of the metal frame and separated from the horizontal cover line by a preselected gap.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
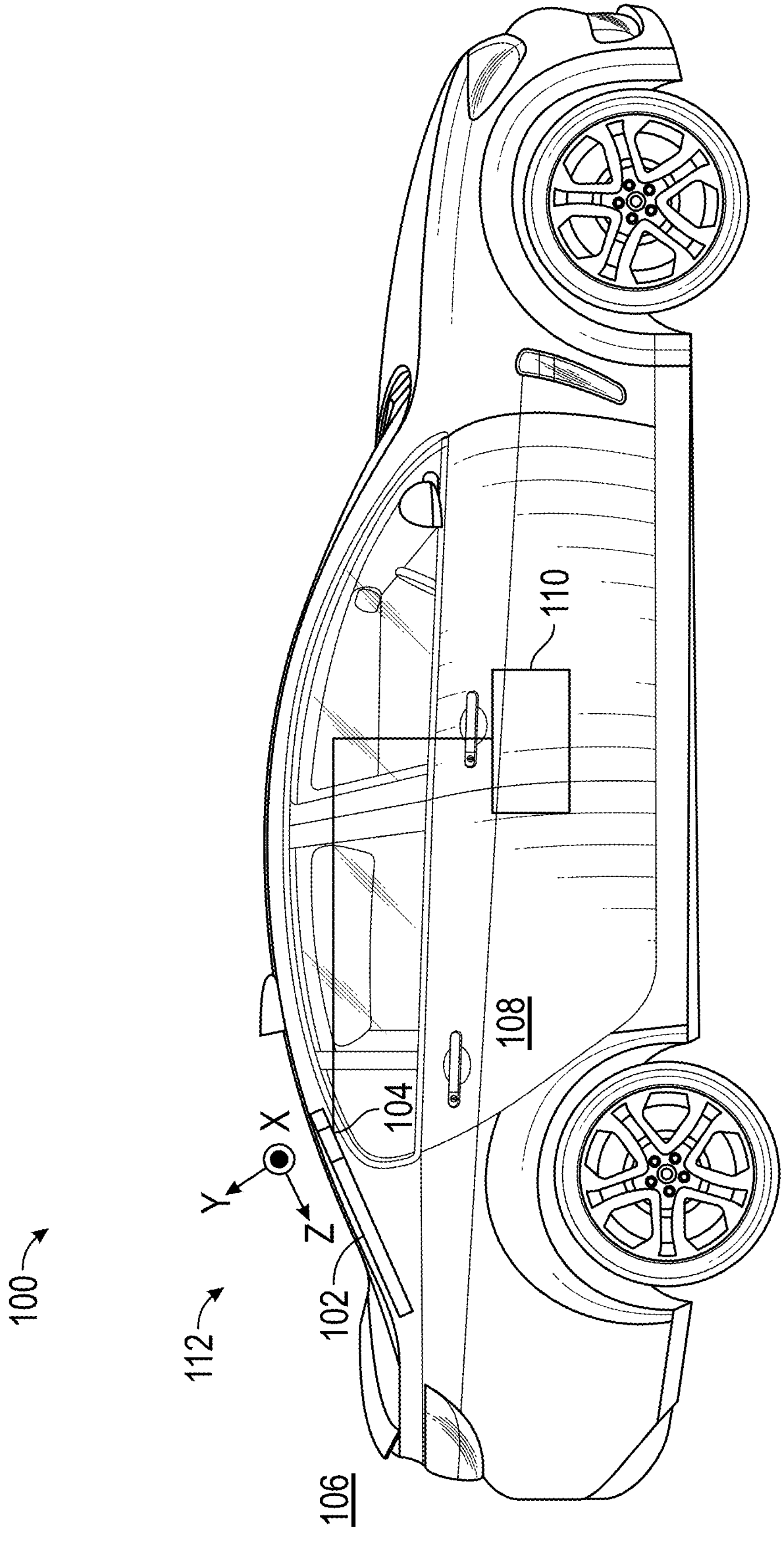
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 includes a window 102 having an antenna assembly 104 embedded therein for communication purposes. The window 102 is shown as a back window of the vehicle 100 but, in various embodiments, can be any window of the vehicle. The window 102 separates the space around the vehicle 100 into an outer region 106 outside of the vehicle (i.e., behind the window 102) and an inner region 108 inside of the vehicle (i.e., in front of the window). A coordinate system 112 is shown for the antenna assembly 104. The x-axis and z-axis define a plane of the window 102 and of the antenna assembly 104. Movement or placement of an object along the x-axis is indicated using the terms "left" and "right", while movement or placement of an object along the z-axis is indicated using the terms "top" and "bottom". The y-axis is directed out of the plane of the window 102 and into the outer region 106. A placement of a first object "on top of" a second object is indicated by the first object being at a more positive location along the y-axis as the second object.

The antenna assembly 104 is coupled to a communication device 110, such as a Global Positioning Satellite (GPS) or a Global Navigation Satellite System (GNSS) receiver, for example. In various embodiments, the antenna assembly 104 is capable of communicating over a range between 600 Megahertz (MHz) and 6 Gigahertz (GHz).

Figure 2:
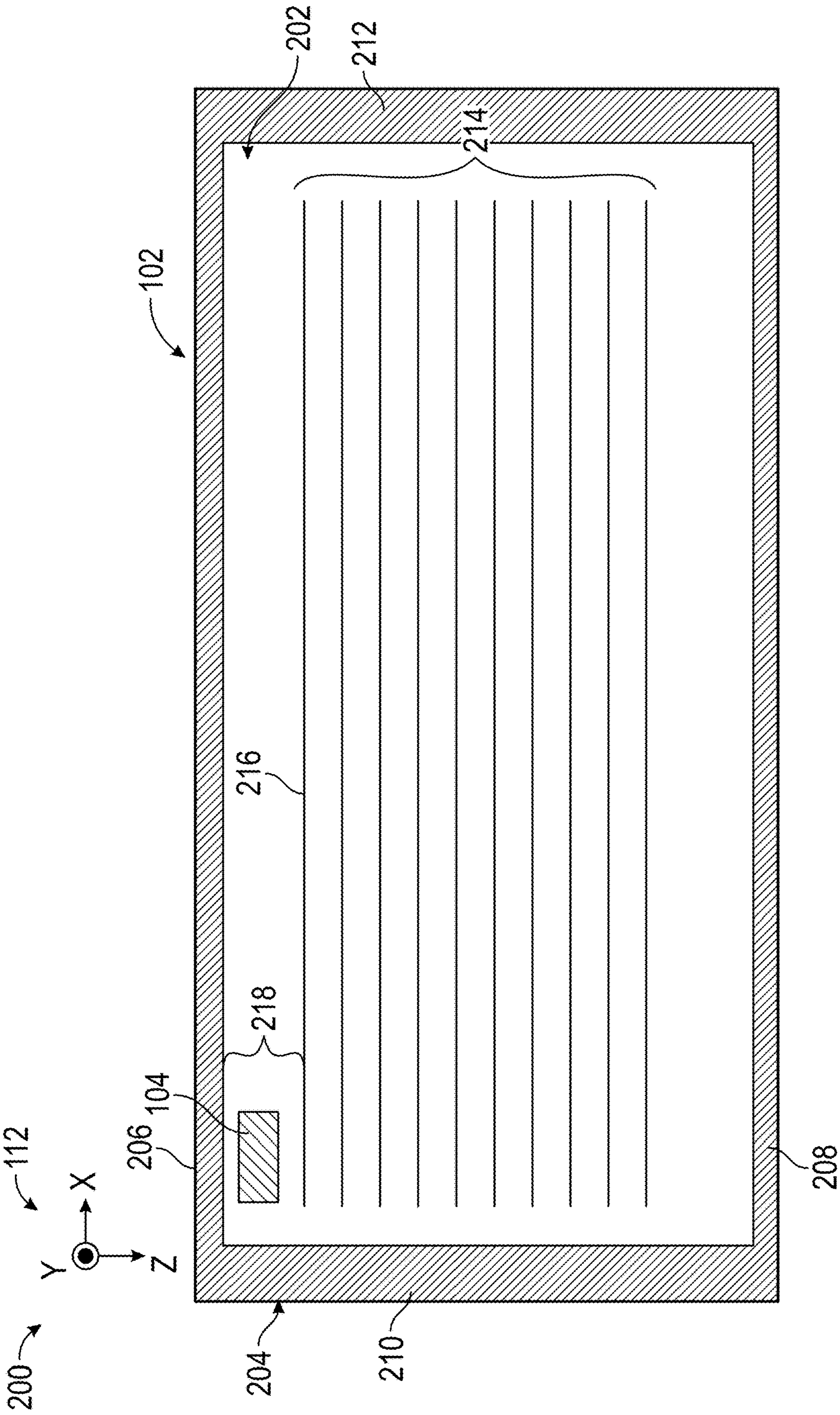
FIG. 2 shows a view of a window of the vehicle, in an embodiment.

FIG. 2 shows a view 200 of the window 102 of the vehicle as seen along the y-axis, in an embodiment. The window 102 includes a glass surface 202 (or glass layer) and a metal frame 204 that secures the glass surface 202 to the vehicle. The metal frame 204 is located at a perimeter of the glass surface 202 and includes a top edge 206, a bottom edge 208, a left edge 210 and a right edge 212. Each of the top edge 206 and the bottom edge 208 form a horizontal edge of the window 102, while each of the left edge 210 and right edge 212 form a vertical edge of the window. Although not shown, the edges of the glass surface 202 can extend underneath respective edges of the metal frame 204. A set 214 of defroster wires fills an area of the window 102. A top wire 216 of the set 214 of defroster wires is separated from the top edge 206 of the metal frame 204 by an antenna region 218. The antenna assembly 104 is disposed in the antenna region 218 in a top left corner of the window 102 (i.e., a corner defined by the intersection of the top edge 206 and the left edge 210). The glass surface 202, the antenna assembly 104 and the metal frame 204 are located in different layers along the y-axis, as discussed herein with respect to FIG. 4.

Figure 3:
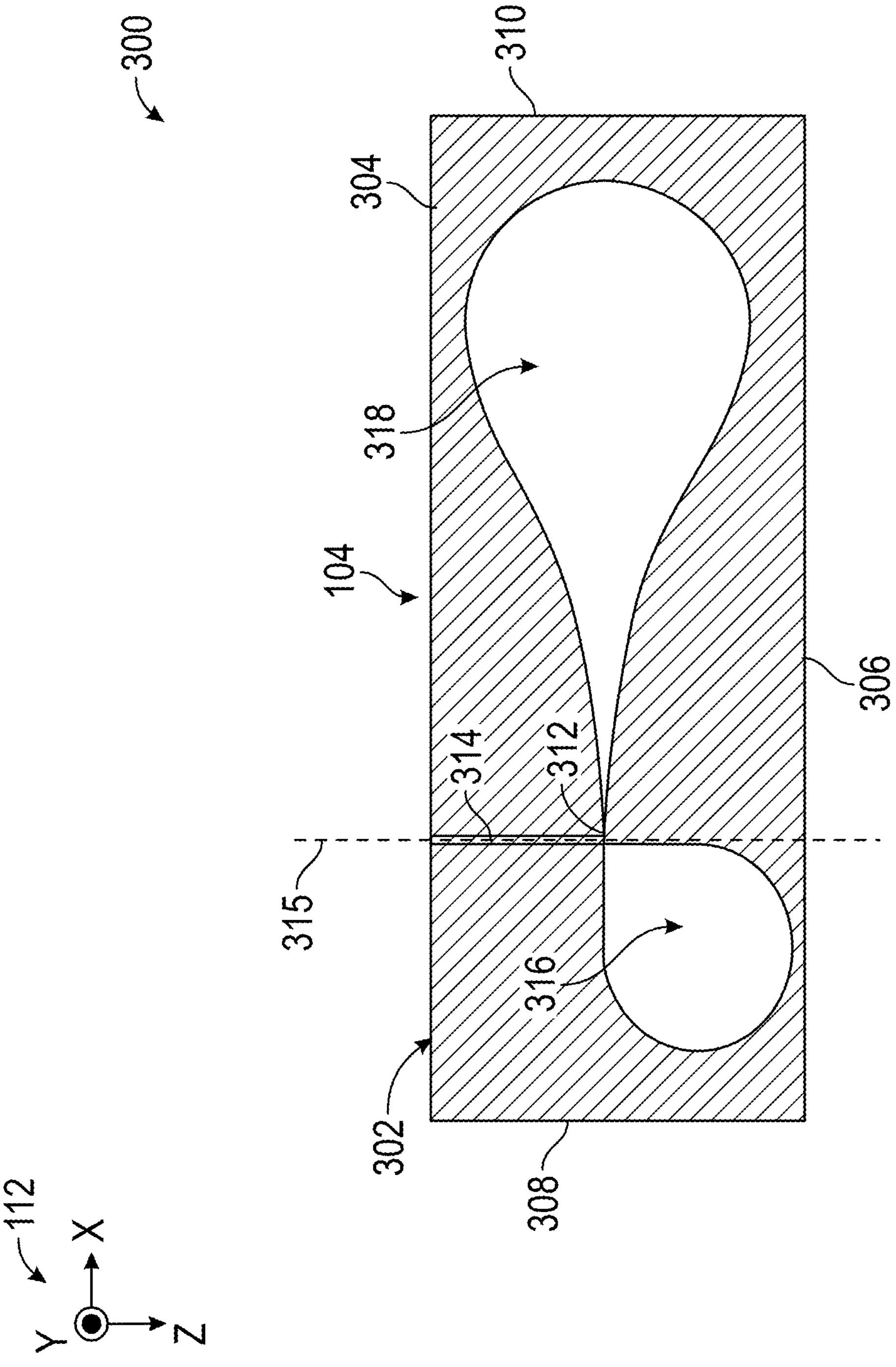
FIG. 3 shows a plan view of an antenna assembly in the window, in an illustrative embodiment.

FIG. 3 shows a plan view 300 of the antenna assembly 104, in an illustrative embodiment. The antenna assembly 104 includes a slot antenna 302. The slot antenna 302 has a rectangular shape, with a top side 304 and a bottom side 306, as well as a left side 308 and a right side 310. A feed point 312 is located centrally within an area of the slot antenna 302. A feed line 314 extends from the feed point 312 along a feed line axis 315 out of the slot antenna 302 at the top side 304. The feed line axis 315 extends along the z-axis.

The slot antenna 302 includes a first slot 316 to a left side of the feed point 312 and a second slot 318 to a right side of the feed point 312. The first slot 316 acts as a radio frequency (RF) balun, while the second slot 318 acts as the main radiating portion of the slot antenna 302. The RF balun transforms an unbalanced RF transmission line to a balanced RF transmission line. The RF balun can also be used to transform a balanced RF transmission line to an unbalanced RF transmission line. The purpose of the first slot 316 is to connect the unbalanced feed line 314 to the balanced antenna slot (second slot 318), thereby allowing for the antenna radiating portion of the slot antenna 302 to be balanced or substantially balanced.

The first slot 316 and the second slot 318 intersect at the feed point 312. The first slot 316 is a mixture of a circular opening and a square opening, with the circular opening taking three quadrants of the slot and a square in the top right quadrant of the slot. An extended vertex of the square is located at the feed point 312. The second slot 318 is in the form of a tear drop extending from the feed point 312 with a point of the tear drop located at the feed point and a wide part of the tear drop distal from the feed point along the x-axis. The first slot 316 and the second slot 318 differ in shape and size, thereby forming an asymmetrical antenna.

Figure 4:
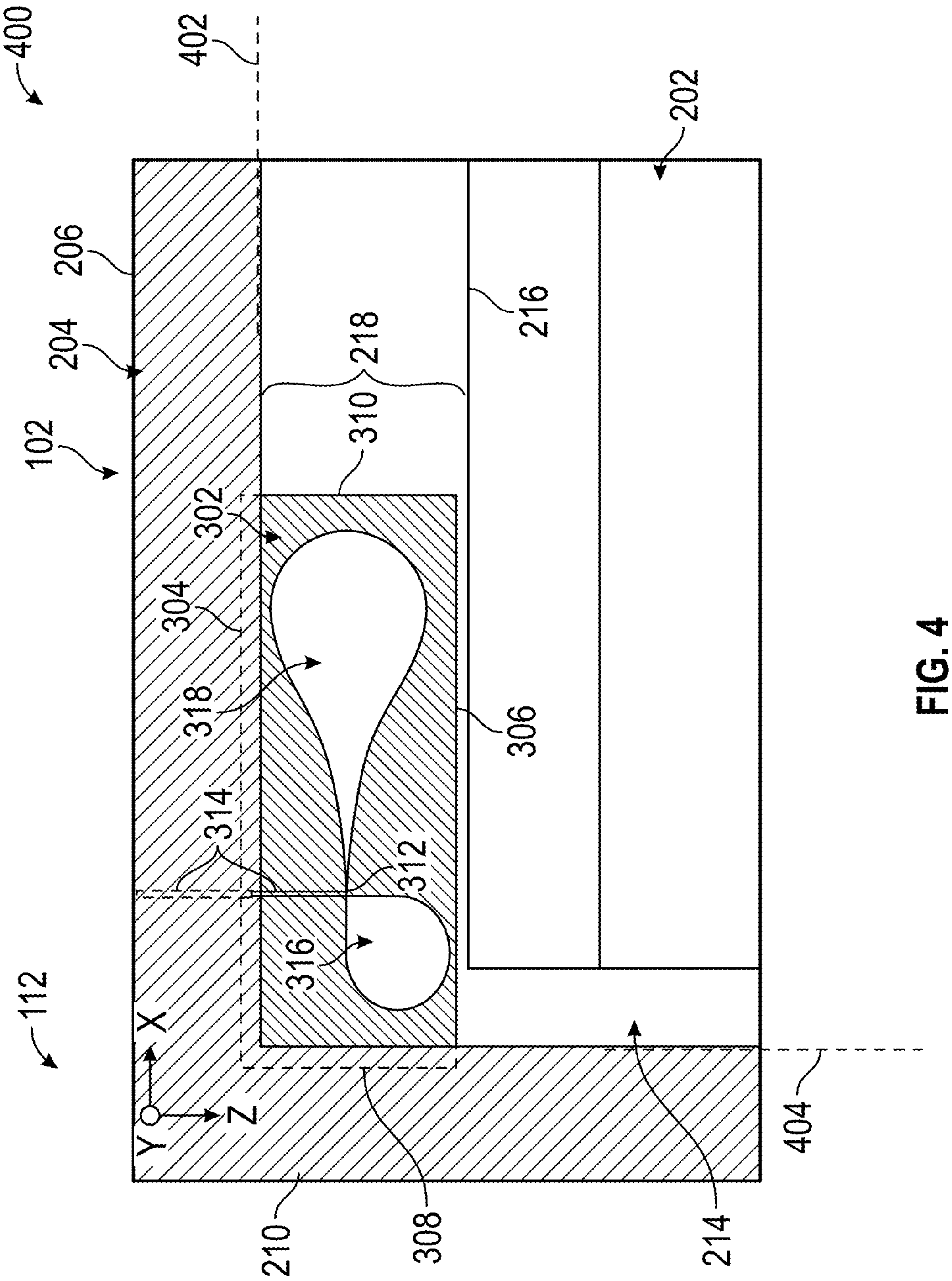
FIG. 4 shows a close-up view of the top left corner of the window, in an illustrative embodiment.

FIG. 4 shows a close-up view 400 of the top left corner of the window 102, in an illustrative embodiment. The close-up view 400 shows the top edge 206 and left edge 210 of the metal frame 204. The top edge 206 defines a horizontal cover line 402 which separates a visible region of the window from a part of the window that is a hidden region underneath the top edge. The left edge 210 defines a vertical cover line 404 which separates a part of the window which is visible from a part of the window that is hidden underneath the left edge.

The slot antenna 302 is disposed in the top left corner on an outer surface of the window 102 within the antenna region 218. The slot antenna 302 is arranged with the top side 304 extends past the horizontal cover line 402 to lie between the metal frame 204 and the glass surface 202. The bottom side 306 is distal from the top edge and is located near the top wire 216 of the set 214 of defroster wires. Also, the left side 308 is located extends past the vertical cover line 404 to lie between the metal frame 204 and the glass surface 202. The first slot 316 and the second slot 318 lie entirely in the visible region of the window. The feed line 314 extends from the feed point 312 out of the slot antenna 302 at the top side 304 and between the metal frame 204 and the glass surface 202 to connect to the communication device 110 so that an RF signal can be transmitted and/or received.

Figure 5:
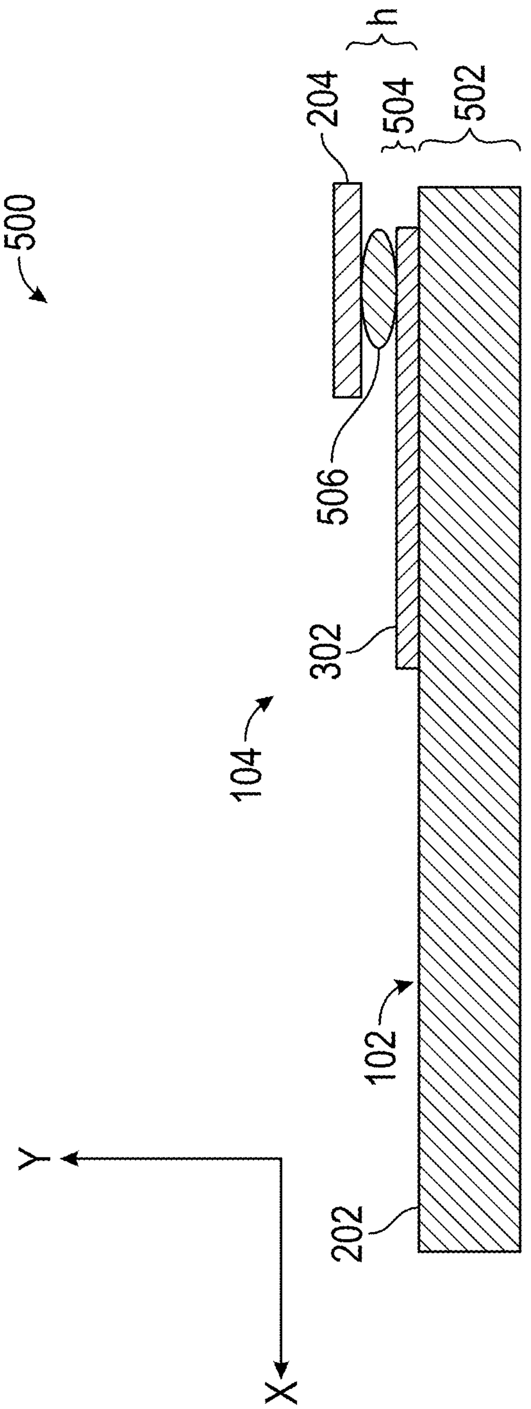
FIG. 5 shows a side view of the window and the antenna assembly, in an illustrative embodiment.

FIG. 5 shows a side view 500 of the window 102 and antenna assembly 104, in an illustrative embodiment. The y-axis is shown with respect to the window 102. The side view 500 includes a glass layer 502 including the glass surface 202, an antenna layer 504 including the slot antenna 302, a conductive adhesive layer 506, and the metal frame 204. The metal frame 204 is separated from the glass surface by a separation gap h. In various embodiments, the separation gap h is about 6 millimeters. A portion of the slot antenna 302 is disposed on the glass surface 202 and within the separation gap h. The conductive adhesive layer 506 is disposed in the separation gap h to secure the portion of the slot antenna 302 to the metal frame 204. The conductive adhesive layer 506 electrically couples the slot antenna 302 to the metal frame 204, thereby grounding the slot antenna 302. In various embodiments, the conductive adhesive layer 506 includes a urethane adhesive.

Figure 6:
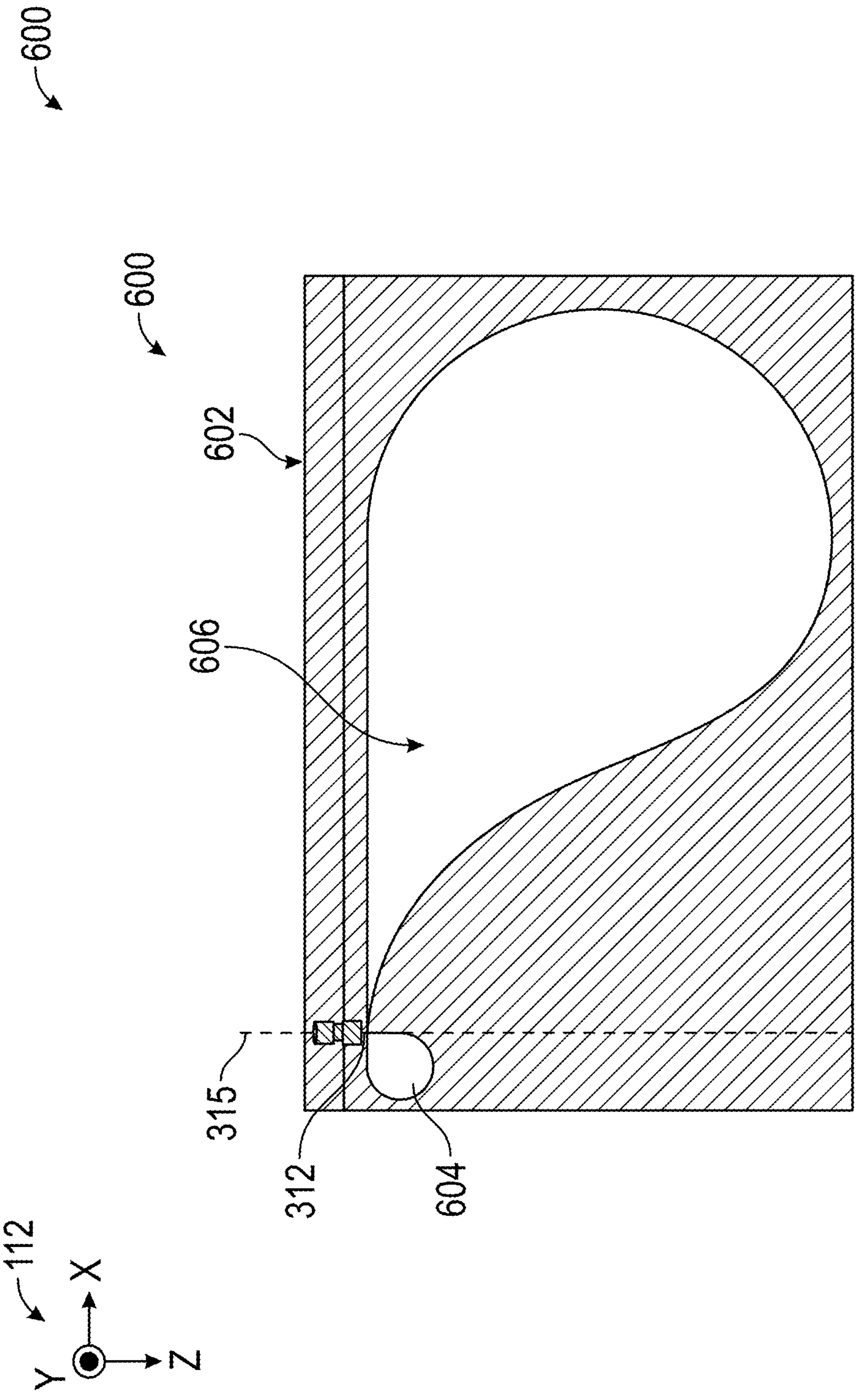
FIG. 6 shows a plan view of a slot antenna in an alternative embodiment.

FIG. 6 shows a plan view 600 of a slot antenna 602 in an alternative embodiment. The slot antenna 602 includes a first slot 604 and a second slot 606. The first slot 604 has the same shape as the first slot 316 in FIG. 3. The second slot 606 has the form of a drooping tear. The different sizes and shapes of the first slot 604 and the second slot 606 make the slot antenna 602 asymmetrical. The relative sizes of the first slot 604 and the second slot 606 are different from the sizes of the first slot 316 and second slot 618 of FIG. 3.

Figure 7:
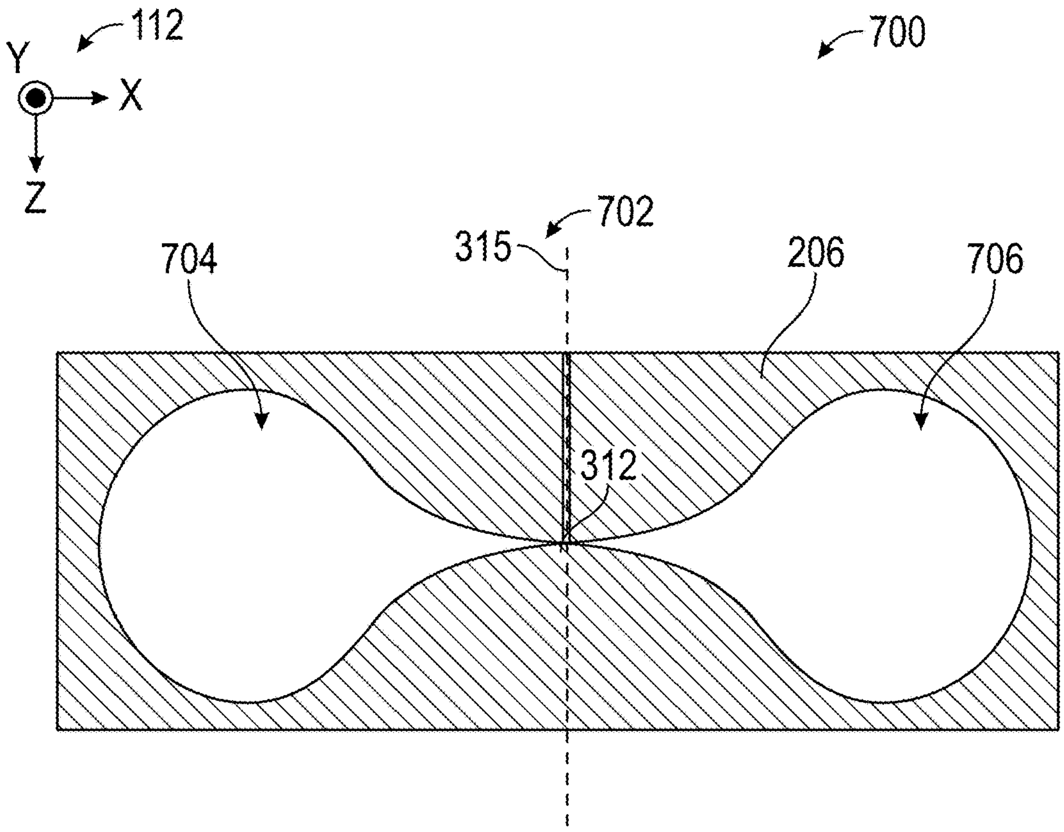
FIG. 7 shows a plan view of a slot antenna having a first slot and a second slot that are symmetric with respect to the feed line axis, in an embodiment.
Figure 8:
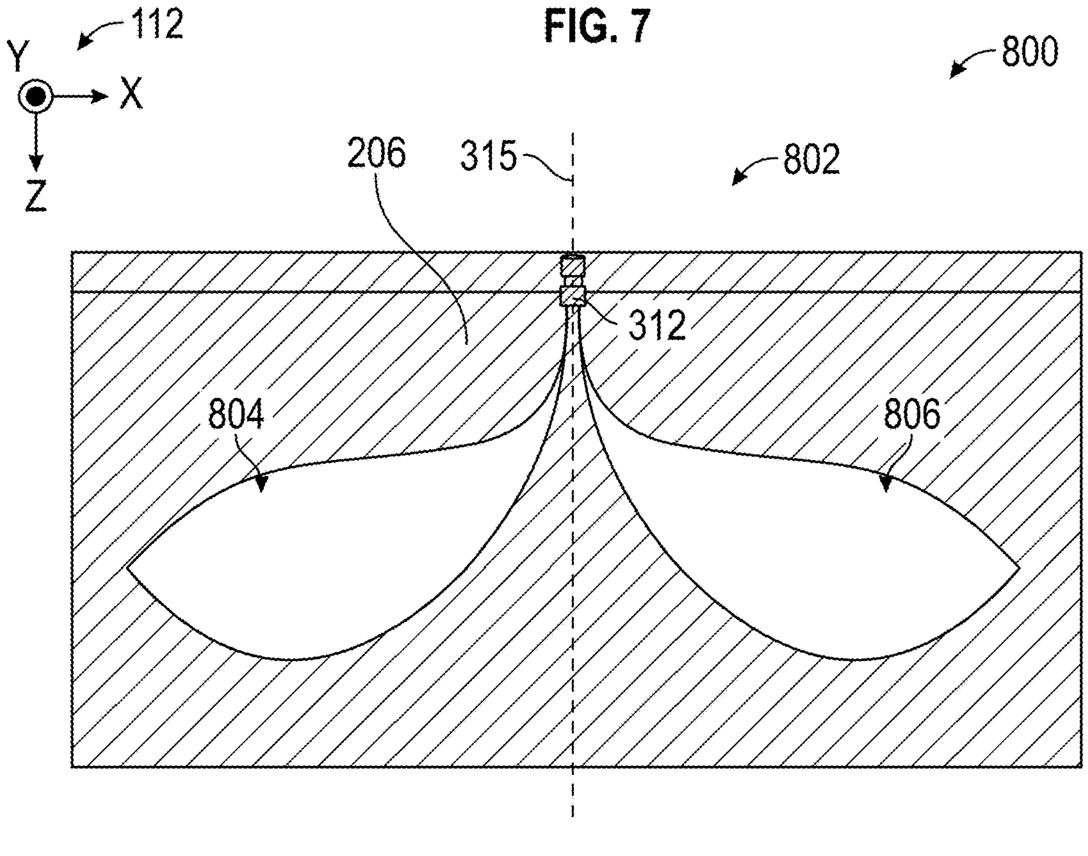
FIG. 8 shows a plan view of a slot antenna having a first slot and a second slot that are symmetric with respect to the feed line axis, in another embodiment.

FIGS. 7 and 8 show symmetrical slot antennas suitable for use with the antenna assembly 104. FIG. 7 shows a plan view 700 of a slot antenna 702 having a first slot 704 and a second slot 706 that are symmetric with respect to the feed line axis 315, in an embodiment. The first slot 704 and the second slot 706 are in the form of a tear drop with pointed ends at the feed point 312 and wide ends distal from the feed point along the x-axis. FIG. 8 shows a plan view 800 of a slot antenna 802 having a first slot and a second slot that are symmetric with respect to the feed line axis, in another embodiment. First slot 804 and second slot 806 are symmetrical about the feed line axis 315 and each are spatulated and extend generally downwards long the z-axis, with the broad ends turning away from the feed line axis 315.

Figure 9:
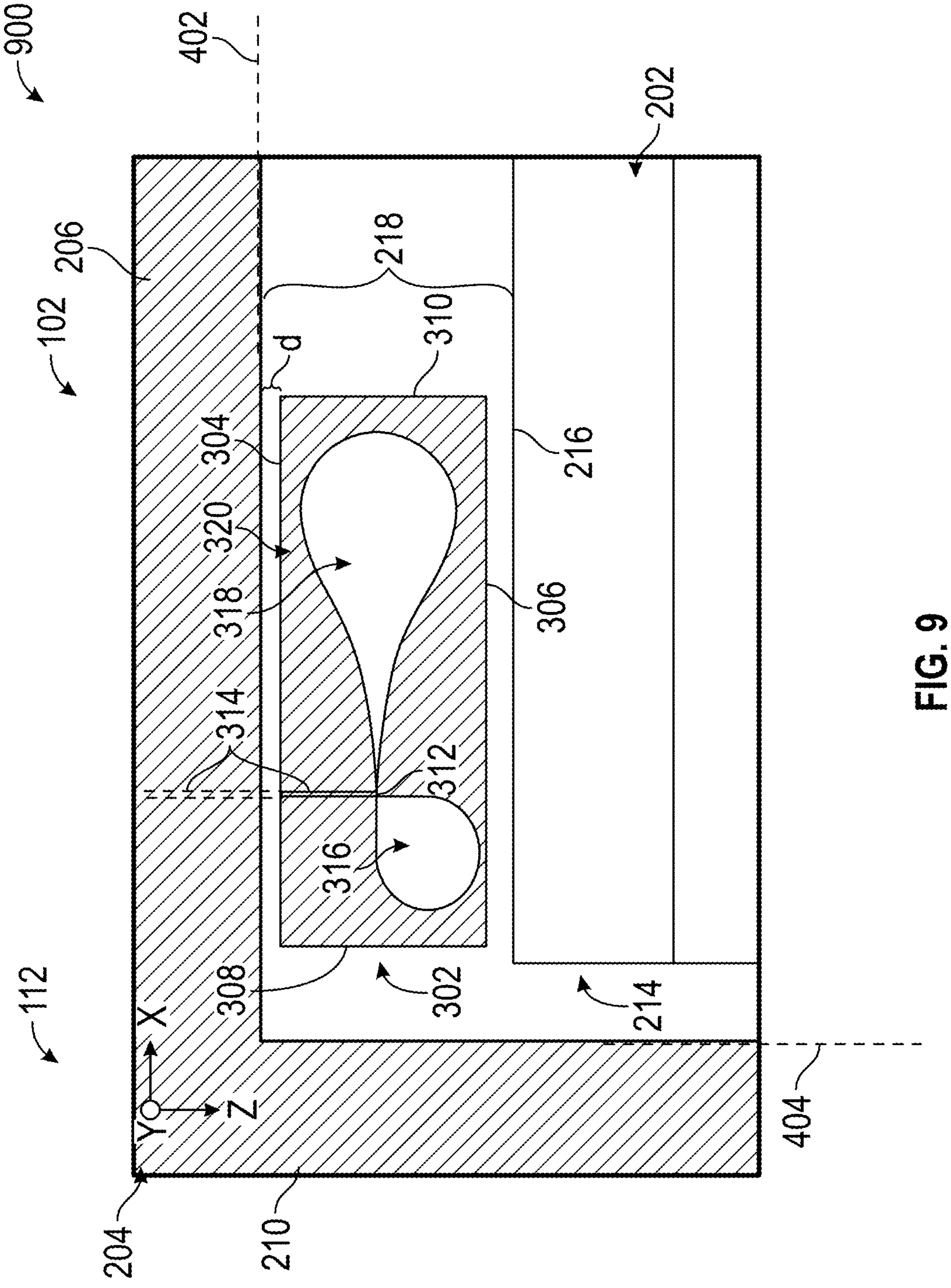
FIG. 9 shows a plan view of the top left corner of the window, in another embodiment.

FIG. 9 shows a plan view 900 of the top left corner of the window 102 in another embodiment. The top side 304 of the slot antenna 302 is located at a preselected distance d from the horizontal cover line 402 of the metal frame 204 by a gap. The left side 308 of the slot antenna 302 is located away from the vertical cover line 404 of the metal frame 204 by a gap.

Figure 10:
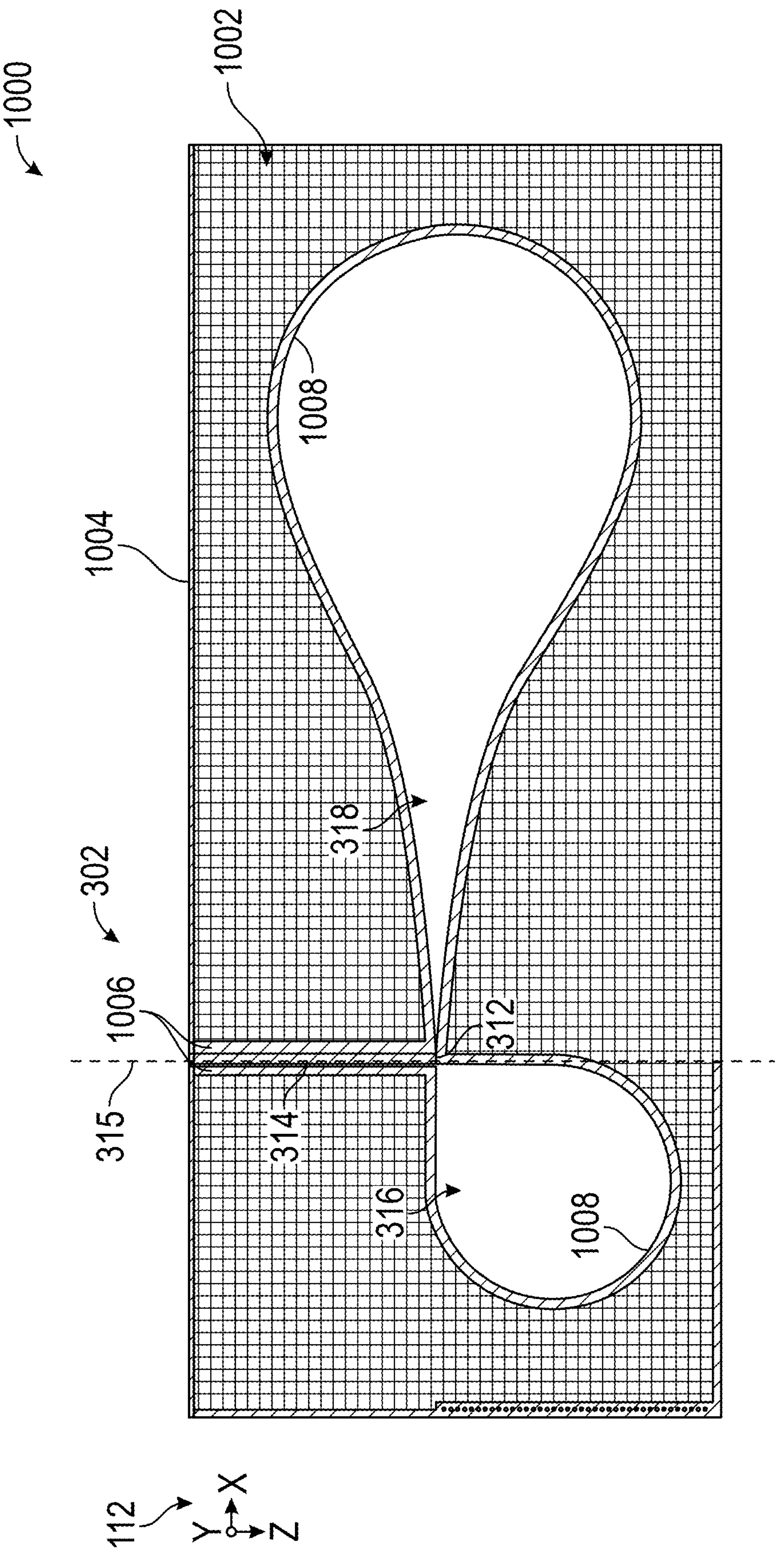
FIG. 10 shows a closeup view of the slot antenna of FIG. 3, in an illustrative embodiment.

FIG. 10 shows a closeup view 1000 of the slot antenna 302 of FIG. 3, in an illustrative embodiment. The slot antenna 302 includes a mesh 1002 of electrical wires surrounded by a contour material that frames the mesh. The contour material is made of wires that are thicker than the electrical wires of the mesh 1002 and which form a continuous conductive material. The contour material includes an edge segment 1004, feed line segments 1008 and slot segments 1008. The edge segment 1004 forms a lines the perimeter of the slot antenna 302. The feed line segments 1008 extend along the feed line 314. Slot segments form contours along the edges of the first slot 316 and the second slot 318.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An antenna assembly suitable for use in a window of a vehicle, comprising:

a slot antenna having a top side and a bottom side opposite the top side, wherein the slot antenna is disposed on a glass surface of the window in a visible region of the window with the top side located proximate a horizontal cover line of a metal frame of the window, wherein the metal frame is over a part of the glass surface and is separated from the glass surface by a separation gap and a portion of the slot antenna resides in the separation gap;

a conductive adhesive layer in the separation gap that electrically couples the portion of the slot antenna to the metal frame;

a feed point located in a central area of the slot antenna, wherein the slot antenna includes a first slot and a second slot which intersect at the feed point; and a feed line that extends from the feed point through the separation gap between the metal frame and the glass surface, wherein the feed line connects the slot antenna to a communication device.

2. The antenna assembly of claim 1, wherein the conductive adhesive layer includes a urethane adhesive.

3. The antenna assembly of claim 1, wherein the first slot and the second slot are one of: (i) symmetrical about a feed line axis; and (ii) asymmetrical about the feed line axis.

4. The antenna assembly of claim 1, wherein the slot antenna includes a mesh of electrical wires.

5. The antenna assembly of claim 1, wherein the top side of the slot antenna is one of: (i) aligned with the horizontal cover line of the metal frame; and (ii) separated from the horizontal cover line by a preselected gap.

6. The antenna assembly of claim 1, wherein the window is a back window including a set of defroster wires and the slot antenna is disposed within an antenna region between the set of defroster wires and a top edge of the metal frame.

7. The method of claim 1, wherein the first slot and the second slot are spatulated and symmetrical about a feed line axis, each having its broad end turning away from the feed line axis.

8. A window of a vehicle, comprising:
- a glass surface;
- a metal frame around the glass surface, wherein the metal frame is over a part of the glass surface and is separated from the glass surface by a separation gap;
- a set of defroster wires in the glass surface, wherein a top wire of the set of defroster wires is separated from a top edge of the metal frame by an antenna region;
- a slot antenna disposed in the antenna region, wherein a portion of the slot antenna resides in the separation gap, the slot antenna having:
  - a top side and a bottom side opposite the top side, wherein the top side is located proximate a horizontal cover line of the metal frame;
  - a feed point located in a central area of the slot antenna, wherein the slot antenna includes a first slot and a second slot which intersect at the feed point; and
  - a feed line that extends from the feed point through the separation gap between the metal frame and the glass surface, wherein the feed line connects the slot antenna to a communication device; and
  - a conductive adhesive layer in the separation gap that electrically couples the portion of the slot antenna to the metal frame.

9. The window of claim 8, wherein the conductive adhesive layer includes a urethane adhesive.

10. The window of claim 8, wherein the first slot and the second slot are one of: (i) symmetrical about a feed line axis; and (ii) asymmetrical about the feed line axis.

11. The window of claim 8, wherein the slot antenna includes a mesh of electrical wires.

12. The window of claim 8, wherein the top side of the slot antenna is one of: (i) aligned with the horizontal cover line of the metal frame; and (ii) separated from the horizontal cover line by a preselected gap.

13. The window of claim 8, wherein the window is a back window of the vehicle.

14. The window of claim 8, wherein the first slot and the second slot are spatulated and symmetrical about a feed line axis, each having its broad end turning away from the feed line axis.

15. A vehicle, comprising:
- a window having a glass surface;
- a metal frame around a perimeter of the window, the metal frame defining at least a horizontal cover line and a vertical cover line, wherein the metal frame is over a part of the glass surface and is separated from the glass surface by a separation gap;
- a set of defroster wires in the glass surface, wherein a top wire of the set of defroster wires is separated from a top edge of the metal frame by an antenna region;
- a slot antenna disposed in the antenna region, wherein a portion of the slot antenna resides in the separation gap, the slot antenna having:
  - a top side and a bottom side opposite the top side, wherein the top side is located proximate the horizontal cover line of the metal frame;
  - a feed point located in a central area of the slot antenna, wherein the slot antenna includes a first slot and a second slot which intersect at the feed point; and
  - a feed line that extends from the feed point through the separation gap between the metal frame and the glass surface, wherein the feed line connects the slot antenna to a communication device; and
  - a conductive adhesive layer in the separation gap that electrically couples the portion of the slot antenna to the metal frame.

16. The vehicle of claim 15, wherein the conductive adhesive layer includes a urethane adhesive.

17. The vehicle of claim 15, wherein the first slot and the second slot are one of: (i) symmetrical about a feed line axis; and (ii) asymmetrical about the feed line axis.

18. The vehicle of claim 15, wherein the slot antenna includes a mesh of electrical wires.

19. The vehicle of claim 15, wherein the top side of the slot antenna is one of: (i) aligned with the horizontal cover line of the metal frame; and (ii) separated from the horizontal cover line by a preselected gap.

20. The vehicle of claim 15, wherein the first slot and the second slot are spatulated and symmetrical about a feed line axis, each having its broad end turning away from the feed line axis.

* * * * *